Figure 1:
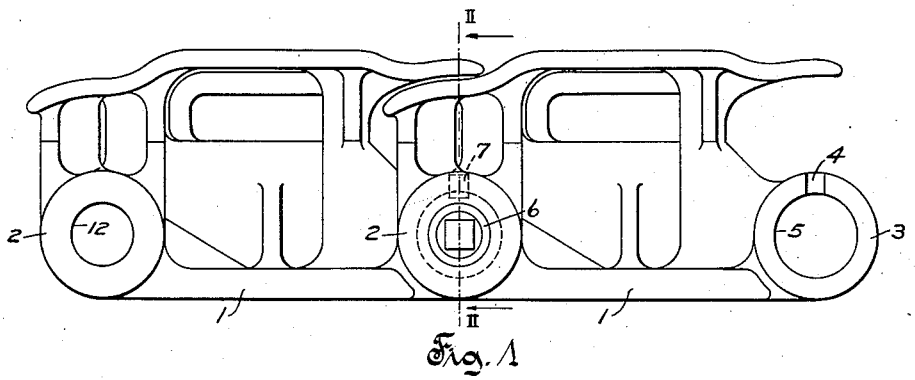

R. C. NEWHOUSE.
BUSHING FASTENING.
APPLICATION FILED NOV. 29, 1915.

1,199,488.

Patented Sept. 26, 1916.

Inventor
R. C. Newhouse
by
Attorney

UNITED STATES PATENT OFFICE.

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

BUSHING-FASTENING.

1,199,488.

Specification of Letters Patent. Patented Sept. 26, 1916.

Application filed November 29, 1915. Serial No. 64,576.

*To all whom it may concern:*

Be it known that I, RAY C. NEWHOUSE, a citizen of the United States, residing at Milwaukee, in the county of Milwaukee and State of Wisconsin, have invented a certain new and useful Improvement in Bushing-Fastenings, of which the following is a specification.

This invention relates to improvements in the construction of chains, and especially to improvements in the construction of bearings for the link connecting pins.

An object of the invention is to provide a chain structure which is simple in construction and efficient in operation.

Another object is to provide a simple and efficient construction of bearings for the link connecting pins.

A further object is to provide simple and efficient means for locking a bearing bushing of any kind to its supporting element.

A clear conception of an embodiment of the invention may be had by referring to the drawing accompanying and forming a part of this specification, in which like reference characters designate the same or similar parts in the various views.

Figure 2:
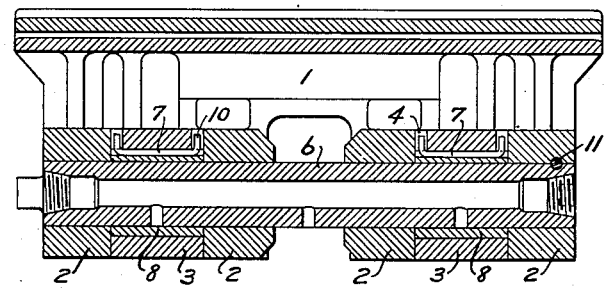
Figure 3:
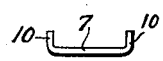
Figure 4:
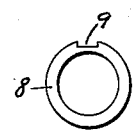

Figure 1 is a side elevation of a pair of chain links having the invention embodied. Fig. 2 is a transverse vertical section through a chain, the section being taken along the line II—II of Fig. 1 looking in the direction of the arrows. Fig. 3 is an elevation of one of the locking devices or clips. Fig. 4 is an end view of one of the bearing bushings.

While the drawing discloses the invention as applied to the links of an endless track for vehicles, it should be understood that the invention is generally applicable to chain structures and other devices in which it is desirable to lock a bearing bushing to its supporting element.

The chain comprises essentially a plurality of tread links 1, each having a plurality of alined elements or bosses 2 at one end thereof, and having a plurality of alined elements or bosses 3 at the opposite end thereof. The bosses 2 of each link are so disposed that each of the bosses 3 of an adjacent link of the assembled chain is located between and engages two bosses 2 of the link. The bosses 2 of each link have alined bores 12 within which the link connecting pin 6 is locked both against longitudinal movement and rotation, by means of a locking pin 11 which passes through one of the bosses 2. The connecting pins 6 are of the usual construction and may be formed with inner lubricant receptacles as disclosed in Fig. 2.

Each of the bosses 3 is provided with a bore 5 and a pair of recesses 4 having surfaces transverse relative to the surface of the bore 5. In the disclosure, the recesses 4 extend to the bore, but this need not be the case. The recesses 4 are preferably formed during the casting of the links 1, while the bores 5 are preferably formed by machining. The ends of the bosses 3 which abut or engage the adjacent bosses 2, are also preferably machined surfaces.

The bushings 8 have through bores which engage the pins 6, and have outer cylindrical surfaces which engage the bores 5 of the bosses 3. Each bushing 8 is provided with a longitudinal groove or recess 9 which is alinable with the transverse recesses 4 of the adjacent boss 3, as shown in Figs. 1 and 2. The locking devices or clips 7 have elongated body portions which fit the recesses 9 of the bushings 8 and have transversely disposed end portions 10 adapted to engage the recesses 4 of the adjacent bosses 3 to lock the bushings 8 against rotation.

In assembling the chain, the clips 7 are first inserted with their ends 10 within the recesses 4 of the bosses 3, after which the bushings 8 may be slid endwise or axially into the bores 5 of these bosses. The links are then positioned with the bores of the bushings 8 in alinement with those of the adjacent bosses 2, after which the pins 6 may be inserted and locked relative to the bosses 2 by insertion of the pins 11.

It will be noted that with this construction, necessity of forming recesses in bores of any of the elements, is eliminated. The longitudinal recesses 9 may be readily formed in the outer portions of the bushings 8 by means of a milling cutter, planer, or similar slotting device. The end recesses 4 in the bosses 3 may be readily formed either during the casting of the links 1, or by means of any suitable slotting device. The locking clips 7 which may be readily formed by bending, positively prevent rotation of the bushings 8 within the bosses 3, while the adjacent bosses 2 positively prevent longitudinal or axial displacement of the bushings 8.

It should be understood that it is not desired to be limited to the exact details of construction shown and described, for obvious modifications will occur to a person skilled in the art.

It is claimed and desired to secure by Letters Patent,—

1. In combination, an element having a bore and a recess formed with a surface which is transverse to the surface of said bore, a longitudinally recessed bushing within said bore, a locking device engaging said bushing recess and said transverse surface, and means for preventing axial displacement of said bushing.

2. In combination, an element having a bore and a recess extending to said bore, said recess having a surface which is transverse to the surface of said bore, a bushing having a longitudinal recess alinable with said element recess, a locking device engaging said bushing recess and said transverse surface, and means for preventing axial displacement of said bushing.

3. In combination, an element having a bore and a recess formed with a surface which is transverse to the surface of said bore, a longitudinally recessed bushing within said bore, a locking device engaging said bushing recess and said transverse surface, and means engaging opposite ends of said bushing for preventing axial displacement thereof.

4. In combination, an element having a bore and a recess extending to said bore, said recess having a surface which is transverse to the surface of said bore, a bushing having a longitudinal recess alinable with said element recess, a locking device engaging said bushing recess and said transverse surface, and means engaging opposite ends of said bushing for preventing axial displacement thereof.

In testimony whereof, the signature of the inventor is affixed hereto.

RAY C. NEWHOUSE.